Dec. 26, 1950     L. C. ROTTER ET AL     2,535,460

HOSE COUPLING

Filed Feb. 17, 1947

Albert T. Laspe,
Lutwin C. Rotter,
Inventors.
Haynes and Koenig,
Attorneys.

Patented Dec. 26, 1950

2,535,460

UNITED STATES PATENT OFFICE 2,535,460

HOSE COUPLING

Lutwin C. Rotter, Maplewood, and Albert T. Laspe, Normandy, Mo., assignors to Lincoln Engineering Company, St. Louis, Mo., a corporation of Missouri Application February 17, 1947, Serial No. 728,972

6 Claims. (Cl. 285—84)

This invention relates to a hose coupling, and with regard to certain more specific features to a high-pressure coupling for high-pressure lubricant hose and the like.

Among the several objects of the invention may be noted the provision of a sturdy high-pressure hose coupling between a metal-core hose and a metal attachment which will avoid deleterious relaxation of the resilient component of the hose in the coupling as the coupling ages; the provision of a coupling of the class described which avoids the reduction in strength and possible leakage resulting from such relaxation; and the provision of a coupling of the class described which is relatively simple and economical to manufacture. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is an enlarged diagrammatic cross section of the end of a length of braided wire-core, high-pressure hose;

Similar reference characters indicate corresponding parts throughout the several views of the drawings.

Figure 1:
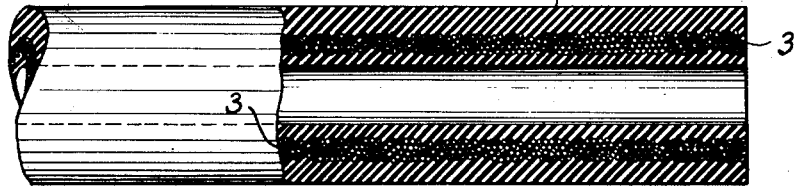

The object of the present invention is to provide a high-pressure coupling on the end of a high-pressure hose such as shown in Fig. 1. This hose is constituted by a tube 1 of resilient material in which is embedded a deformable wire braid 3. In some hose of this type the braid is formed from deformable metal other than of the wire form, such as, for example, equivalent metal ribbons. Among the services to which such hose is put is that of transmitting lubricants and the like which would deteriorate ordinary rubber. The transmission is often at very high pressures. The resilient material used is generally one of the so-called synthetic rubbers which are not quickly attacked chemically by the lubricant along the main run of the hose. Provision of resistance against such chemical attack has been generally successful, except insofar as is concerned that part of the hose which is squeezed or clamped in the ordinary hose coupling required at the hose end. It has been found that if the hose end is squeezed in the ordinary manner in making the coupling attachment after aging of the coupling, a certain amount of relaxation sets in on the squeezed part of the synthetic resilient material. This tends toward loosening and leakage, particularly under said higher pressures.

Figure 2:
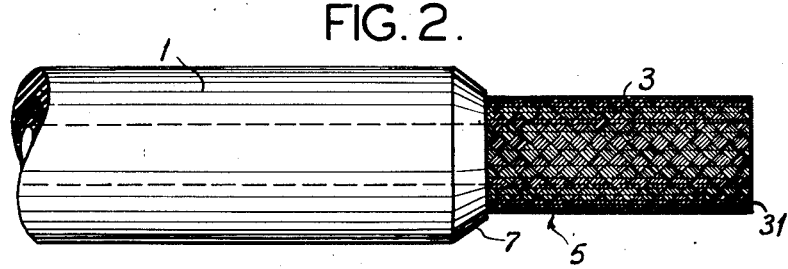
Fig. 2 is a side elevation of the hose end shown in Fig. 1 after a first operation has been performed.

It will be noted from Fig. 1 that the braid 3 is neither on the outer surface of the hose nor on the inner surface but embedded some distance behind each of these surfaces. In Fig. 2 it is shown how at the end of the hose 1, a portion of the resilient cover outside of the braid 3 is removed. This may be accomplished by grinding or slicing. For a hose of approximately ¾ inch outside diameter, the removal is effected for a distance of the order of 1⅜ of an inch, as indicated at numeral 5, leaving a beveled edge at numeral 7. The removal of the outside resilient material is effected to the extent that the outer surface of the braid 3 in the affected region will be substantially completely exposed. The interior rubber surface within the braid is left untouched.

The coupling itself comprises a steel nipple 9 having a threaded endwise socket 11 for attaching purposes and an extension stem 13. This stem is grooved or serrated, as indicated at 15 resulting in annular collars 12 around it. It is connected with the socket 11 through a portion having a threaded collar 17 behind which is an undercut groove 19. At numeral 21 is shown a soft-metal ferrule, composed for example of aluminum which is interiorly threaded, as indicated at 23, for threading onto the collar 17 and coming to a seat at shoulder 25. The threads extend from the seat 25 through the ferrule 21 to a bevel 27 at the base of a counter-bore 29 therein.

Figure 3:
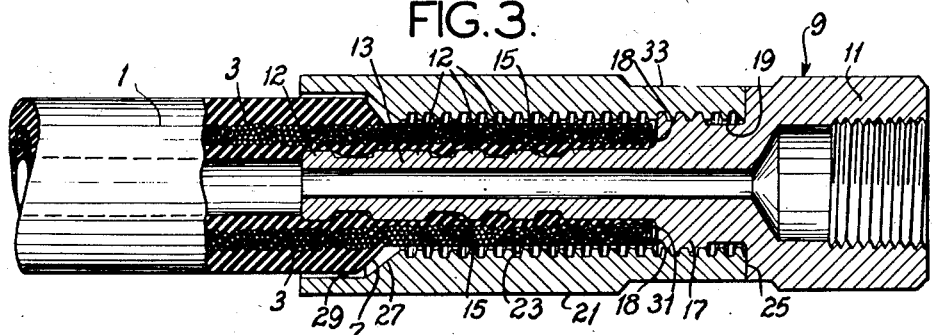
Fig. 3 is a cross section showing an assembly of parts after a second operation has been performed.
Figure 4:
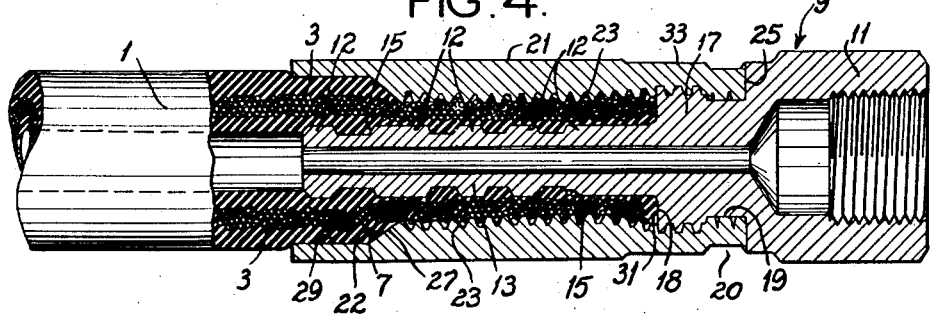
Fig. 4 is a view similar to Fig. 3 after a third and last operation has been performed.

To perform the assembly operation illustrated in Fig. 3, the nipple 9 is threaded with the ferrule 21 into the relationship shown. Then the end of the hose which has been treated as shown in Fig. 2 is pushed into position from the left in Fig. 3. The arrangement is such that the inside diameter of the inside resilient portion of the hose grips on the serrated outside of the stem 13. The pushing operation is continued until the end 31 of the skinned hose rests near the end 18 of the collar 17 but preferably allowing some space at this point. The inside diameter of the threads 23 is somewhat longer than the outside diameter of the exposed-braid-end of the hose. Other dimensions are such that this operation brings the end of the stem 13 beyond the bevel 7. This also brings the counterbore 29 beyond said bevel 7 and approximately opposite the end of the stem 13. This also places the bevel 27 opposite the bevel 7.

Next, the parts of Fig. 3 are subjected to a swedging operation by means, for example, of a six-segment radial die (not shown). This radially squeezes in the metal of the ferrule 21 causing the inside high portions of the thread 23 which are exposed opposite the exposed braid 3 to squeeze indirectly on the exposed outside of the braid 3. Because of the limited areas of contact, there is a tendency for the threads to penetrate the wire braid, thus forming a strong metal-to-metal keying action. Conversely the braid wires have a tendency to squeeze into the soft-metal threads thus producing a strong hooked interlock. The squeezing action also tightly squeezes the inner resilient rubber core into the serrations 15 of the stem 13 insuring a thorough seal. Squeezing of the hose parts around the stem 13 also causes axial flow of the resilient material around the stem 13, the space allowed at 18 permitting this. Squeezing also tends to expand the ferrule axially, thus encouraging axial expansion of the hose on the stem 13. Thus the end 31 of the hose is pushed against shoulder 18 and enhances the seal, although primary sealing is accomplished along the length of the stem 13. This primary seal is very effective because the axial expansion of the rubber within the serrations of the stem 13 insures that it packs axially against the protrusions such as 12 left by the serrations. This insures more than a plain radial seal around the stem, since incoming pressure only tends to enhance the axial seating effect on the protrusions 12. It may be noted in this connection that the counterbore 29 accepts the large diameter of the hose providing a neat appearance. By having the adjacent counterbored end of the ferrule 21 backed up by the end of the stem 13 a good support is obtained avoiding kinking of the hose at this point. During the die compression operation, radial pressure is also exerted at 20 to pinch into the groove 19 the parts of the thread which are there exposed adjacent to the seat 25. This operation at 20 may, if desired, be brought about in a separate step as by spinning or knurling. This locks the ferrule to the nipple 9, preventing subsequent unscrewing, and gives further assurance against blowing out of the nipple.

In view of the above, it will be seen that instead of compressing the ferrule 21 only against resilient material, it interlocks with the non-resilient braid throughout most of the length of the couplings. Hence, there will be no relaxation with age of any substantial amount of the resilient material between the braid 3 and the thread 23. Any possible relaxation of resilient material between the outside of the serrated extension 13 and the resilient inside of the hose has a negligible effect because of the axially expanded condition of the rubber in the serrations between the protrusions 12. Hence, the coupler will remain effective to seal without leakage against greater pressures for a much longer operating life than heretofore.

The overall result is a coupling which is applied extremely tightly around the end of the hose and which without leakage will have a long life in the face of extreme abuse.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A hose coupling for a resilient hose having a deformable metal core spaced from its inside and outside resilient surfaces; comprising a hollow nipple having a threaded shoulder and a tubular stem from the shoulder inserted within the end of the hose, said hose at its end having its core exposed, the inside diameter of the threads of the shoulder being greater than the outside diameter of the exposed core, and an internally threaded ferrule threaded to the shoulder and having part of its threads swedged to the exposed core.

2. A hose coupling for a resilient hose having a braided metal core spaced from its inside and outside resilient surfaces; comprising a hollow hard-metal nipple having a threaded shoulder and a grooved and collared tubular stem inserted within the end of the hose, said hose at its end having its core exposed, the length of the exposure being less than the length of said extension, the inside diameter of the threads of the shoulder being greater than the outside diameter of the exposed core, and a threaded soft-metal ferrule threaded to the shoulder and having part of its threads swedged to the exposed core.

3. A hose coupling for a resilient hose having a braided metal core spaced from its inside and outside resilient surfaces; comprising a hollow hard-metal nipple having a threaded shoulder and a smaller grooved and collared tubular extension inserted within the end of the hose, said hose at its end having its core exposed, and a threaded soft-metal ferrule threaded to the shoulder, the inside diameter of the threads of the shoulder being larger than the outside diameter of the exposed core, said ferrule being swedged radially to effect an interlock between its threads and said core, the swedging being adapted to effect both radial and axial compression of the inside resilient surface of the hose into the grooves of the stem and axially against its adjacent collars.

4. A hose coupling for a resilient hose having a braided metal core spaced from its inside and outside surfaces; comprising a hollow nipple having an extension comprising a serrated portion inserted into the end of the hose, said nipple having a threaded collar positioned adjacent to the end of the hose after insertion and a groove under the threaded collar, said hose at its end having its braided core exposed for a distance from the hose end less than the length of the inserted extension of the nipple, the inside diameter of the collar threads being larger than the outside diameter of the exposed core, and a ferrule having an internal thread which is threaded to said collar and extends over said groove, a substantial portion of the threads of the ferrule lying around the exposed core, said ferrule having a counterbore for accepting endwise outside resilient portions of the hose, the counterbore being positioned around the end of said inserted extension, said ferrule being swedged inward whereby the counterbore grips its contained resilient material and the inner threads of the ferrule are gripped against the exposed core and forced into said groove.

5. A hose coupling for a resilient hose having a braided wire core spaced from its inside and outside surfaces; comprising a hollow nipple having an extension comprising a serrated portion inserted into the end of the hose, said nipple having a threaded collar positioned adjacent to the end of the hose after insertion and a groove under the threaded collar, said hose at its end having its braided core exposed for a distance from the hose end less than the length of the inserted extension of the nipple and having its adjacent outside resilient material beveled, the diameter of the threads on the collar being larger than the diameter of the exposed portion of the core, and a ferrule having an internal thread which is threaded to said collar and extends over said groove, a substantial portion of the threads of the ferrule lying around the exposed core, said ferrule having a counterbore beveled at its bottom for accepting the endwise beveled resilient portions of the hose, the counterbore being positioned around the end of said inserted extension, said ferrule being swedged inward whereby the counterbore bevel contacts the resilient bevel while gripping its contained resilient material, and part of the inner threads of the ferrule being gripped against the exposed core and part of them being forced into said groove.

6. A hose coupling for a resilient hose having a braided wire core spaced from its inside and outside surfaces; comprising a hollow nipple having an extension comprising a serrated portion inserted into the end of the hose, a threaded collar positioned adjacent to the end of the hose after insertion and a groove under the threaded collar, said hose at its end having its outside resilient material removed to expose the outside of the braided core for a distance from the hose end less than the length of the inserted extension of the nipple, the diameter of the threads on the collar being larger than the diameter of the exposed portion of the core, and a ferrule having a thread throughout its length which is threaded to said collar and extends over said groove, a substantial portion of the threads of the ferrule lying around the exposed core, said ferrule having a counterbore for accepting unremoved outside resilient portions of the hose, the counterbore being positioned around the end of said inserted extension, said ferrule being swedged inward whereby the counterbore grips its contained resilient material and the inner threads of the ferrule are gripped against the exposed core and forced into said groove, the base of the counterbore and said end of the outside resilient material being cooperatively beveled.

LUTWIN C. ROTTER.
ALBERT T. LASPE.

REFERENCES CITED

The following references are of record in the file of this patent:

UNITED STATES PATENTS

| Number | Name | Date |
|---|---|---|
| 2,121,624 | Cowles | June 21, 1938 |
| 2,171,945 | Norgren | Sept. 5, 1939 |
| 2,399,791 | Conroy | May 7, 1946 |